(12) United States Patent
Milne (10) Patent No.: US 9,040,829 B2
(45) Date of Patent: May 26, 2015

(54) CAPACITIVE TOUCH PANELS

(75) Inventor: David Charles Milne, Oxon (GB)

(73) Assignee: M-SOLV LIMITED, Oxford (GB)

( * ) Notice: Subject to any disclaimer, the term of this patent is extended or adjusted under 35 U.S.C. 154(b) by 249 days.

(21) Appl. No.: 13/503,038

(22) PCT Filed: Oct. 23, 2009

(86) PCT No.: PCT/GB2009/002524
§ 371 (c)(1),
(2), (4) Date: May 8, 2012

(87) PCT Pub. No.: WO2011/048347
PCT Pub. Date: Apr. 28, 2011

(65) Prior Publication Data
US 2012/0211264 A1    Aug. 23, 2012

(51) Int. Cl.
*H05K 1/00*          (2006.01)
*G06F 3/044*         (2006.01)

(52) U.S. Cl.
CPC .......... *G06F 3/044* (2013.01); *Y10T 29/49155* (2015.01); *Y10T 29/5313* (2015.01)

(58) Field of Classification Search
USPC .................. 174/250; 324/663; 345/173, 174; 349/71; 359/265, 838; 438/29
See application file for complete search history.

(56) References Cited

U.S. PATENT DOCUMENTS

| | | | | |
|---|---|---|---|---|
| 4,124,926 A * | 11/1978 | Kupsky et al. | .................. | 445/24 |
| 4,371,746 A * | 2/1983 | Pepper, Jr. | ................. | 178/18.05 |
| 5,070,230 A * | 12/1991 | Osada et al. | .................. | 219/203 |
| 5,276,382 A * | 1/1994 | Stocker et al. | ................. | 313/506 |
| 5,332,946 A * | 7/1994 | Eckersley et al. | ............. | 313/506 |
| 5,637,882 A * | 6/1997 | Divigalpitiya et al. | ....... | 250/580 |
| 5,717,255 A * | 2/1998 | Haga et al. | ..................... | 257/781 |
| 5,872,050 A * | 2/1999 | Haga et al. | ..................... | 438/617 |
| 6,034,335 A * | 3/2000 | Aufderheide et al. | ........ | 200/5 A |
| 6,433,489 B1 * | 8/2002 | Tanaka et al. | ............... | 315/169.4 |
| 6,654,071 B2 * | 11/2003 | Chen | ............................... | 349/12 |
| 8,604,547 B2 * | 12/2013 | Yukawa et al. | ............... | 257/350 |
| 2002/0098612 A1 * | 7/2002 | Ahn et al. | ........................ | 438/51 |
| 2002/0135569 A1 * | 9/2002 | Chen | ............................ | 345/173 |
| 2002/0167621 A1 * | 11/2002 | Chen | ............................ | 349/12 |
| 2002/0195435 A1 * | 12/2002 | Nagarkar et al. | ........ | 219/121.73 |
| 2003/0029831 A1 * | 2/2003 | Kawase | .......................... | 216/27 |
| 2003/0197688 A1 * | 10/2003 | Aufderheide et al. | ........ | 345/173 |
| 2004/0032638 A1 * | 2/2004 | Tonar et al. | .................... | 359/265 |
| 2004/0178006 A1 * | 9/2004 | Cok | ............................. | 178/18.01 |
| 2005/0070037 A1 * | 3/2005 | Robeson et al. | ................ | 438/29 |

(Continued)

FOREIGN PATENT DOCUMENTS

WO    WO-2007/115032 A2    10/2007

*Primary Examiner* — Xiaoliang Chen
(74) *Attorney, Agent, or Firm* — Harness, Dickey & Pierce, P.L.C.

(57) ABSTRACT

A novel method and apparatus for performing the method is disclosed the apparatus comprises a laser (17), at least one ink jet print head (14), means for holding a transparent substrate having a transparent conductive layer, means (22) for adjusting the relative positions of the laser and at least one ink jet print head to the transparent conducting layer (2) and a controller to control the laser and ink jet print head whereby in a first step to inkjet print one or more coarse metal borders (15) onto the deposited TCM layer and in a second step by means of a single laser ablation process, ablating tracks in both the metal border and underlying TCM layer to form a plurality of discrete electrical busbars (12) and optionally also to form electrodes in the remainder of the TCM layer.

19 Claims, 10 Drawing Sheets

(56) References Cited

U.S. PATENT DOCUMENTS

| | | | |
|---|---|---|---|
| 2005/0073507 A1* | 4/2005 | Richter et al. | 345/174 |
| 2005/0083307 A1* | 4/2005 | Aufderheide et al. | 345/173 |
| 2005/0139398 A1* | 6/2005 | Endo | 178/18.01 |
| 2005/0181697 A1* | 8/2005 | Ashida et al. | 445/24 |
| 2006/0033981 A1* | 2/2006 | Chaug et al. | 359/296 |
| 2006/0181772 A1* | 8/2006 | Byers et al. | 359/512 |
| 2006/0193031 A1* | 8/2006 | Moore | 359/296 |
| 2006/0232180 A1* | 10/2006 | Kang et al. | 313/336 |
| 2007/0019296 A1* | 1/2007 | Bauer et al. | 359/603 |
| 2007/0201122 A1* | 8/2007 | Dozeman et al. | 359/265 |
| 2007/0262312 A1* | 11/2007 | Liu et al. | 257/72 |
| 2008/0006865 A1* | 1/2008 | Liu et al. | 257/296 |
| 2008/0049295 A1* | 2/2008 | Tonar et al. | 359/267 |
| 2008/0053522 A1* | 3/2008 | Basol | 136/256 |
| 2008/0129317 A1* | 6/2008 | Oba | 324/663 |
| 2008/0266685 A1* | 10/2008 | Byers et al. | 359/838 |
| 2008/0289680 A1* | 11/2008 | MacFarlane | 136/246 |
| 2009/0201268 A1* | 8/2009 | Endo et al. | 345/174 |
| 2009/0205879 A1* | 8/2009 | Halsey, IV et al. | 178/18.06 |
| 2009/0322705 A1* | 12/2009 | Halsey, IV | 345/174 |
| 2009/0323162 A1* | 12/2009 | Fanton et al. | 359/275 |
| 2010/0038352 A1* | 2/2010 | Byers et al. | 219/202 |
| 2010/0060822 A1* | 3/2010 | Sun | 349/71 |
| 2010/0090597 A1* | 4/2010 | Werners et al. | 313/512 |
| 2010/0230154 A1* | 9/2010 | Naito et al. | 174/389 |
| 2010/0265206 A1* | 10/2010 | Chen | 345/174 |
| 2011/0006999 A1* | 1/2011 | Chang et al. | 345/173 |
| 2011/0012842 A1* | 1/2011 | Lee et al. | 345/173 |
| 2011/0109590 A1* | 5/2011 | Park | 345/174 |
| 2011/0134075 A1* | 6/2011 | Takusa | 345/174 |
| 2012/0169664 A1* | 7/2012 | Milne | 345/174 |

* cited by examiner

CAPACITIVE TOUCH PANELS

CROSS-REFERENCE TO RELATED APPLICATIONS

This application is a 371 U.S. National Stage of International Application No. PCT/GB2009/002524, filed on Oct. 23, 2009, the disclosure of which is herein incorporated by reference in its entirety.

The present invention relates to improvements in capacitive touch panels, in particular, the invention relates to the surface electrodes and connecting edge busbars for use in capacitive touch panels and a method for providing such structures.

Capacitive touch panel technology is in wide use, for example in mobile phones, satellite navigation systems, PDA screens and handheld games consoles.

One particular form of capacitive touch panel is known as projective capacitive touch technology or "PCT". In PCT devices, an XY array of sensing electrodes is formed in layers of transparent conducting material. In use, capacitance forms between the user's fingers and the projected capacitance from the sensing electrodes. A touch is made, precisely measured and translated into a command which is executed by underlying electronic devices for an appropriate software application. PCT screens enjoy the benefits of responding accurately to both fingers and styli.

One particular form of PCT technology has two separated layers of transparent conducting material (TCM) and it is the changes in the mutual capacitance between the electrodes at the intersection points that are detected. Each TCM layer is divided into a plurality of discrete parallel electrode cells. The electrodes on one layer are aligned in a first direction parallel to one edge of the panel whereas the electrodes on the other layer are aligned in a second direction that is orthogonal to the first direction.

Another form of PCT technology uses a single TCM layer and it is the changes in the self-capacitance between separate areas in this layer that are detected. A convenient way to make such a single layer PCT device is to divide up the TCM layer into electrically separated areas that are then interconnected by means of conducting bridge structures to form sets of orthogonal electrodes. One set of electrodes is aligned in a first direction parallel to one edge of the panel whereas the other set of electrodes are aligned in a second direction that is orthogonal to the first direction.

In both single and double layer devices it is necessary to make electrical connections to the ends of every X electrode and every Y electrode in order to monitor the changes in capacitance between electrodes induced by a touch event on the surface of the touch panel. Since the ends of the X electrodes are at an edge of the panel that is orthogonal to the edge where the Y electrodes end there is a requirement to form connections to external circuitry at both of these edges. For larger touch panels such as are used in notebook PCs it is generally possible to make connections directly to orthogonal edges. In hand held devices however there is usually a strong requirement to extend the usable viewing area of the touch panel close to at least two opposite edges of the device. Consequently, very little border area is available on these edges to make the connections to the electrodes that run perpendicularly to these edges. One solution is to bring all X and Y electrode connections out on one edge of the touch panel leaving available space on other edges of the touch panel. This means that additional conducting structures have to be formed in the TCM layer in the border regions at the side edges of the panel to route electrical connections to the end. Sometimes these border conductors are referred to as busbars If all X & Y electrodes are accessible at a single edge then a known arrangement for providing electrical connections involves bonding a flexible ribbon type multi way cable to the electrodes. Contacts are made on one or two sides of the panel for the cases of a single layer or a double layer touch panel respectively. Examples of these arrangements and methods for providing them are described in more detail by reference to Figures below.

The performance of a PCT panel depends strongly on the resistance between the electrodes and the integrated circuit (IC) that processes the signals from the electrodes. Since the their width is very small, busbars produced in the TCM layer alone have been found to have excessive resistance. This is conventionally compensated for by the addition of a layer of metal in the edge border regions. This metal layer can be deposited either on top of the deposited TCM or alternatively can be applied to the substrate before the TCM is deposited such that it is situated between the substrate and the TCM. The metal layer is generally applied by a process such as Physical Vapour Deposition (PVD)

Manufacturing processes currently used to form the busbar structures in the metal and TCM layer to the prior known design are slow, complex operations and are both environmentally damaging and expensive. Furthermore, due to the large number of steps involved in the processes and the small size of the structures to be formed, there is a strong likelihood that an error will occur during production leading to a defective product.

The present invention seeks to provide a process for manufacturing a reliable PCT panel which is simple and cost effective compared to prior known methods and which consistently provides a good quality reliable product.

In accordance with the present invention, there is provided; a method for the manufacture of a PCT panel comprising;
 1. onto a transparent substrate, uniformly depositing a layer of transparent conducting material (TCM);
 2. onto the same transparent substrate printing a printable conductive ink (PCI) in selected areas to form one or more coarse conductive border regions
 3. by means of a single laser ablation process, ablating material in the PCI layer and the TCM layer to form a plurality of discrete electrical tracks (busbars) and ablating a pattern of electrodes into the remainder of the TCM layer.

Desirably step 1 precedes step 2 such that the PCI layer is on top of the TCM layer but optionally step 2 may precede 1 such that the PCI layer is between the substrate and the TCM layer.

Conveniently the PCI is deposited by means of an inkjet printing process. Other conventional printing processes may also be used in the alternative, for example screen printing.

TCM deposition should follow PCI printing for the case where PCI printing is the first process and the substrate has no TCM layer prior to PCI printing.

Laser ablation is the third process and takes place in a unit that consists of at least one laser, means for holding a transparent substrate which has deposited layers of TCM and PCI, means for focusing the laser beam on the surface of the substrate, means for adjusting the relative positions of the laser beam to the substrate and a controller to control the laser whereby by means of a single laser ablation process, ablating material from the layers of PCI and TCM through to the substrate surface to form fine isolating trenches to create a plurality of discrete electrical busbars and also ablating fine trenches into the remainder of the TCM layer to form a pattern of electrodes The generic term "transparent conducting material" (TCM) is intended to denote all suitable transparent conductors. One suitable TCM is indium tin oxide (ITO).

It is to be appreciated that multiple PCT panels can be provided on a single, large transparent substrate. Borders will define individual PCT panels and will not necessarily coincide with the outermost borders of the substrate sheet.

In another aspect the invention provides an apparatus for performing the novel method described above, the apparatus comprising a TCM deposition unit, a PCI printing unit and a laser ablation unit. Preferably these three units are all separated but optionally one or more processes may be combined into a single unit. TCM deposition onto the transparent substrate is preferably the first process but optionally may be the second process. TCM deposition may be by a PVD process or alternatively may also use a separate printing process. PCI printing is preferably the second process and in this case takes place onto a transparent substrate that has a TCM layer deposited uniformly on at least one side.

The printing unit consists of at least one ink jet print head, means for holding a TCM coated transparent substrate, means for adjusting the relative position of the ink jet print head to the substrate and a controller to control the ink jet print head whereby to inkjet print PCI to form one or more coarse conductive border regions in selected areas on the substrate.

The laser ablation unit comprises at least one laser, means for holding a transparent substrate which has deposited layers of TCM and PCI, means for focusing the laser beam on the surface of the substrate, means for adjusting the relative positions of the laser beam to the substrate and a controller to control the laser whereby by means of a single laser ablation process, ablating material from the layers of PCI and TCM through to the substrate surface to form fine isolating trenches to create a plurality of discrete electrical busbars and optionally also ablating fine trenches into the remainder of the TCM layer to form a pattern of electrodes The controller may be same controller as is used to control the inkjet head.

Desirably, the PCI printing apparatus comprises two ink jet print heads mounted together with one behind the other in the moving direction and having a displacement in the direction orthogonal to the moving direction equal to half the pitch of the print head nozzles such that the resolution of the printing process is doubled and the application of a continuous layer of conducting metal ink is possible in a single pass of the printheads over each area of the substrate Optionally, the ink jet print heads are configured to deposit a PCI which contains metal or other conducting particles. Desirably, the particles are silver. Cabot Conductive Ink 300 containing silver particles has been found to be especially suitable.

One suitable ink jet print head for the novel apparatus is the Konika Minolta KM1024 head.

One suitable laser is a pulsed UV laser configured to operate at 355 nm.

Conveniently, the controller controls movement of a scanner to move the laser beam and/or print head in two orthogonal directions over the substrate_and optionally also to move the substrate in two orthogonal linear axes In another aspect, the invention provides a PCT panel comprising a layer of transparent conducting material (TCM) deposited onto a transparent substrate and divided into a plurality of electrodes, and a metal border deposited onto the TCM layer by an inkjet printing method and having ablated tracks in both the border and underlying TCM layer to form busbars.

Optionally, the electrodes of the TCM layer are also defined by ablations in the layer.

The transparent substrate may be organic (plastic) or inorganic (glass).

The TCM layer may be formed from inorganic materials, for example, indium tin oxide. Other suitable transparent conducting oxides include, without limitation, Tin oxide (SnO2), doped Zinc oxide (ZnO), etc. Such inorganic TCM layers are generally applied by PVD methods. Alternatively the TCM layer may be of organic conducting material. Examples of organic materials (without limitation) are PEDOT (polyethylenedioxythiophene), polyanilene or polythiophene. Such polymers are selected to achieve coatings with the required optical transmittance (desirably 90% in range 400-800 nm) and surface resistance of typically less than 100 or 200Ω per square. Soluble conducting polymers based on polyanilines,_polythiophenes, polypyrroles or polyisothianaphthenes meet these requirements. Such organic TCMs are generally applied by some type of printing process. TCM layers may also be made using carbon nano-tubes or metal nano-wires. Such materials can also generally be applied by printing methods.

The known prior art and some embodiments of the invention will now be described in more details with reference to the accompanying figures in which.

Figure 1:
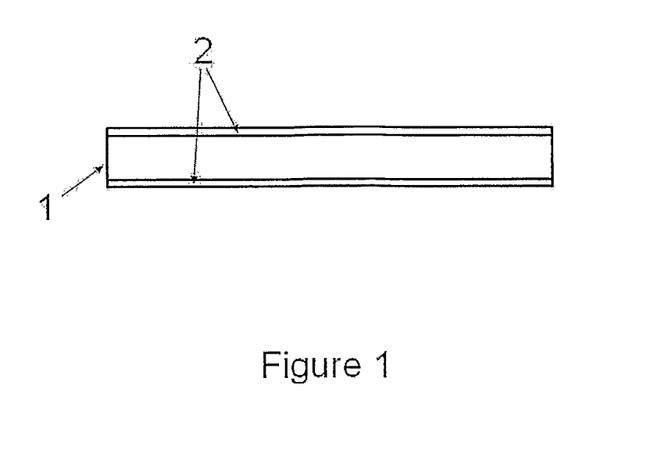
FIG. 1 shows a cross section of the substrate used for a typical two layer PCT panel as known from the prior art.

As can be seen from FIG. 1, a substrate 1 is transparent and may be either rigid and made of glass or other inorganic transparent material (eg silica) or flexible and made of polymer such as (but not strictly limited to) polyester (PET) or polycarbonate (PC). The thickness of the substrate may be in a range from a fraction of one mm to many mm. Thin layers of a material 2 that is both transparent and electrically conducting are applied to both sides of the substrate. These TCM layers may for example be made of an inorganic oxide material such as Indium Tin Oxide (ITO), Tin Oxide (SnO2), Zinc Oxide (ZnO) or other oxide in which case they are referred to as TCOs (transparent conductive oxides) and for example (but without limitation) is applied by physical vapour deposition (PVD). In the alternative other transparent conducting layers based on organic materials or nano-particle materials can also be used. The latter might, for example, be applied by printing type processes. Typical TCM layer thicknesses are sub micron. The sheet resistances of TCM layers used in touch panels usually lie in the range 100Ω to many 100Ω per square.

Figure 2:
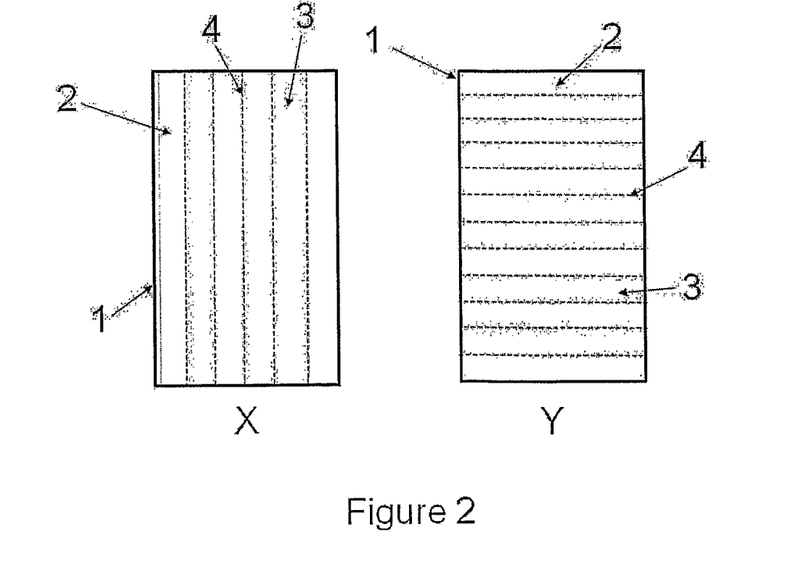
FIG. 2 shows electrode structures used to form a common type of two layer PCT panel as known from the prior art.

In FIG. 2 the two diagrams show plan views of the opposite faces of the transparent substrate 1. The TCM layer 2 on each side is divided into several separate linear electrodes 3 by breaks 4 in the TCM layer that penetrate to the substrate surface. These electrically isolating breaks are typically made by lithographic processes involving chemical or plasma etching or preferably by laser scribing. The breaks are ideally sufficiently narrow that they are indiscernible to the eye. Electrodes on one face of the substrate run in the orthogonal direction to those on the opposite face to form sets of X-Y electrodes. Touch panels that are to be used in a hand held device are generally rectangular and usually have sizes up to about 80×120 mm. Touch panels for Notebook PCs are substantially larger being typically up to 250 mm×150 mm in size. Electrode widths in the TCM layer vary from a few mm size to many mm. Electrode layouts may be more complex than shown in the Figure but in general they always consist of some type of orthogonal X-Y array.

Figure 3:
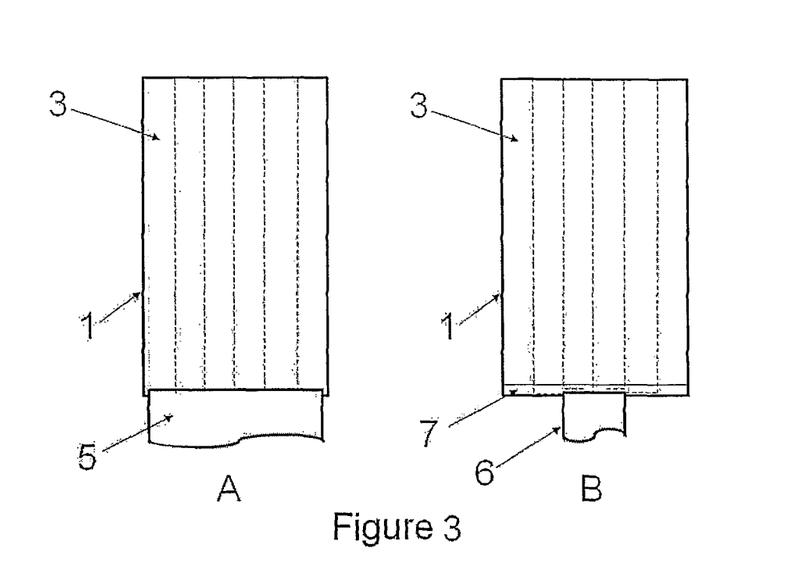
FIG. 3 shows an example of how connections are made to one set of electrodes on one edge of a PCT panel using a flexible ribbon type multi way cable bonded to the electrodes as known from the prior art.

As can be seen in FIG. 3 a flexible ribbon type multi way cable is readily bonded to the electrodes 3 the ends of which are readily accessible. FIG. 3A shows the case where the ribbon connector 5 is as wide as the touch panel so connection is direct. FIG. 3B shows the common case where the ribbon connector 6 is less wide than the touch panel. In this case it is usual to form suitable breaks and structures in the TCM layer in a border region 7 near the edge to redirect all electrodes towards the connector region and to form suitable pads at the end of each extended electrode to simplify connection to the ribbon cable. Such electrode redirection structures in the TCM layer are common and are made by the same lithographic or laser process that forms the main breaks in the TCM layer. The techniques for aligning and bonding the flexible ribbon cable to the ends of the electrodes or the pads connecting to the electrodes are well known.

Figure 4:
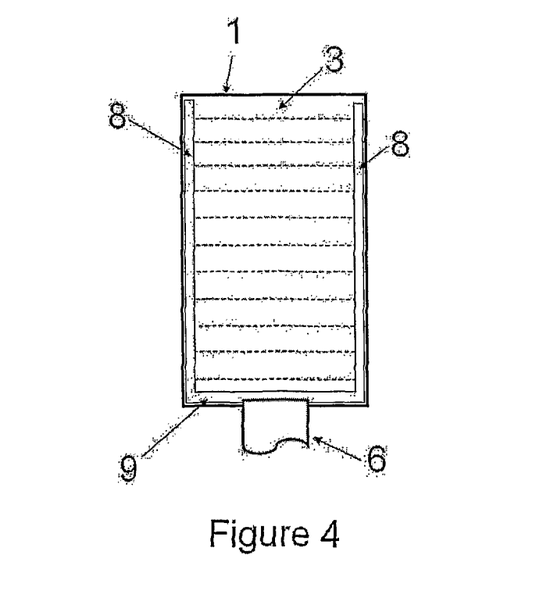
FIG. 4 shows another example of how connections are made to both sets of electrodes on one edge of a PCT panel using a flexible ribbon type multi way cable bonded to the electrodes as known from the prior art.

As can be seen in FIG. 4, suitable breaks are made in the TCM layer in narrow border regions 8 running parallel to and close to one or both of the edges of the touch panel that are orthogonal to the electrodes. The structures formed in the TCM layer in these side regions 8 and at the connector edge 9 form electrical connections that extend from the ends of each linear electrode down the edges to suitable pads to which the ribbon connector 6 can be bonded. Details of the electrical break structures in the TCM are not shown in the figure as these are very fine. As the border regions 8 have to be very narrow (typically less than 1 mm) and many (typically 10 to 15) electrical tracks have to be fitted into one or both borders the width of individual electrical tracks in these border regions can be as little as a few tens of microns. The performance of a PCT panel depends strongly on the resistance between the electrodes and the integrated circuit (IC) that processes the signals from the electrodes. The actual value required for each electrode line needs to be ideally less than a few 100Ω. The resistance due to the copper conductors in the ribbon cable is relatively low as is the connection to the pads in the TCM layer so the key resistive elements that dominate the total resistance from the IC to the electrodes are the TCM busbars at the side edges. As an example, for a TCM layer such as ITO with a sheet resistance of 100Ω per square a busbar with a length of only 50 mm and a width of 0.25 mm will have an end to end resistance of 20 kΩ. Such a busbar with a width of 0.05 mm will have a resistance of 100 kΩ. Such values are excessive and hence to reduce the busbar resistance it is necessary to add a layer of a highly conducting material such as a metal to the TCM in the edge regions 8 and 9.

Figure 5:
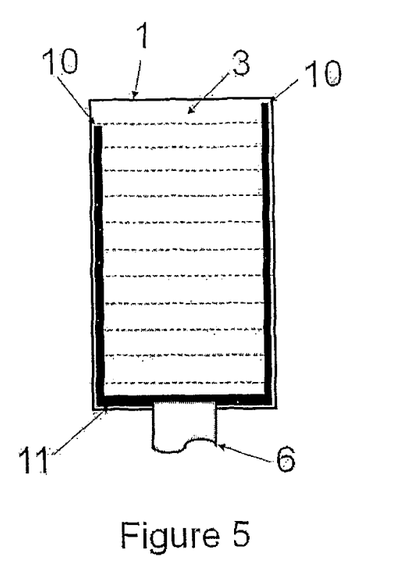
FIG. 5 shows a plan view of a typical PCT panel with TCM electrodes running parallel to the edge where a ribbon cable is connected as known from the prior art.
Figure 6:
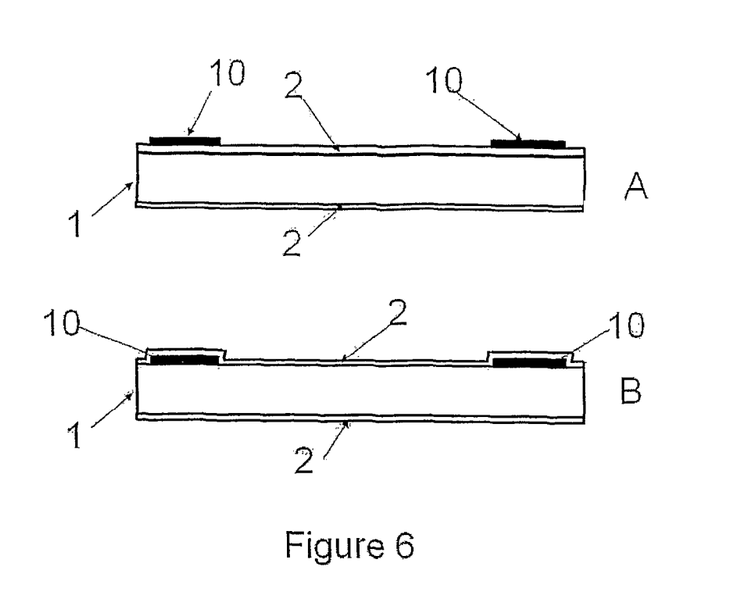
FIG. 6 shows two cross sections through the type of PCT panel shown in FIG. 5.

FIG. 5 shows a plan view of a typical touch panel 1 with TCM electrodes 3 running parallel to the edge where the ribbon cable 6 is connected. In this case bands of metal 10 have been deposited on top of or below the TCM layer close to one or both side edges where busbars are required to be formed. Metal has also been deposited in a band 11 adjacent to the connector edge to form the busbars in this region. Metallization in this end region is desirable but not essential since the length of the TCM conducting tracks is much less and the width generally much more than those in the side busbars FIG. 6 shows two cross sections through the type of two layer touch panel shown in FIG. 5. As can be seen, the sections are in the direction parallel to the electrode direction in the TCM layer 2 on the upper side. Bands of metal 10 each side are applied to the areas where busbars are to be formed. Metal bands are not essential on the lower side since on this side where the TCM electrodes run perpendicular to those on the upper side connections from the electrodes to the ribbon cable can be made directly. FIG. 6A shows the case where the metal bands 10 have been applied on top of the upper TCM layer 2. FIG. 6B shows the case where the metal bands 10 are applied directly to the substrate and the TCM layer 2 is applied over the top.

Figure 7:
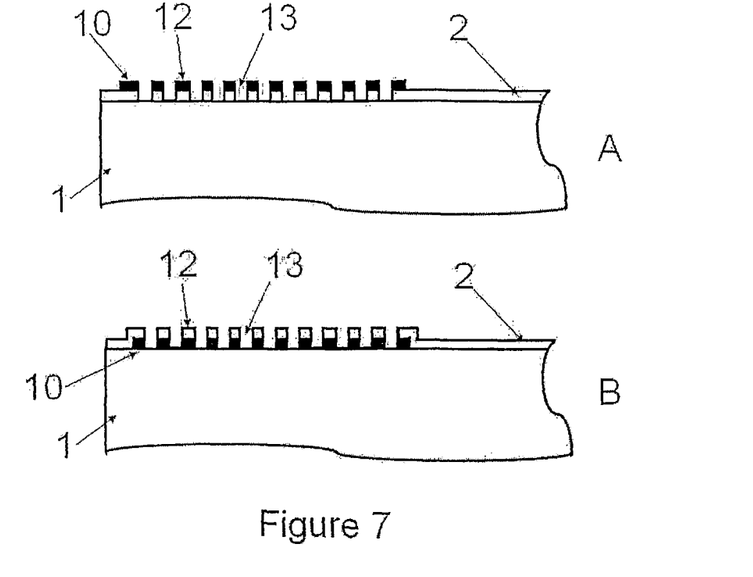
FIG. 7 shows enlarged views of one edge of the upper side of the PCT panel shown in FIGS. 5 and 6.

FIG. 7 shows enlarged views of one edge of the upper side of the touch panel 1 after busbars 12 have been formed by making separating breaks 13 through both the metal layer 10 and the TCM layer 2. FIG. 7A shows the case where the metal bands 10 have been applied on top of the upper TCM layer 2. FIG. 7B shows the case where the metal bands 10 are applied directly to the substrate and the TCM layer 2 is applied over the top.

To be effective in terms of reducing the busbar resistance to a satisfactorily low level the thickness of the metal applied is in the range of 100 nm to several 100 nm. As an example of the busbar resistance values obtained with a metal layer consider the case where a 100 nm thick layer of copper is applied by a PVD process. Such a metal layer has a sheet resistance of about 0.35Ω per square so the resistances of 50 mm long busbars with widths of 0.25 and 0.05 mm are 70Ω and 350Ω respectively. For a 350 nm layer of aluminum the sheet resistance is about 0.2Ω per square and 50 mm long tracks with a width of 0.05 mm have a resistance of 200Ω.

Figure 8:
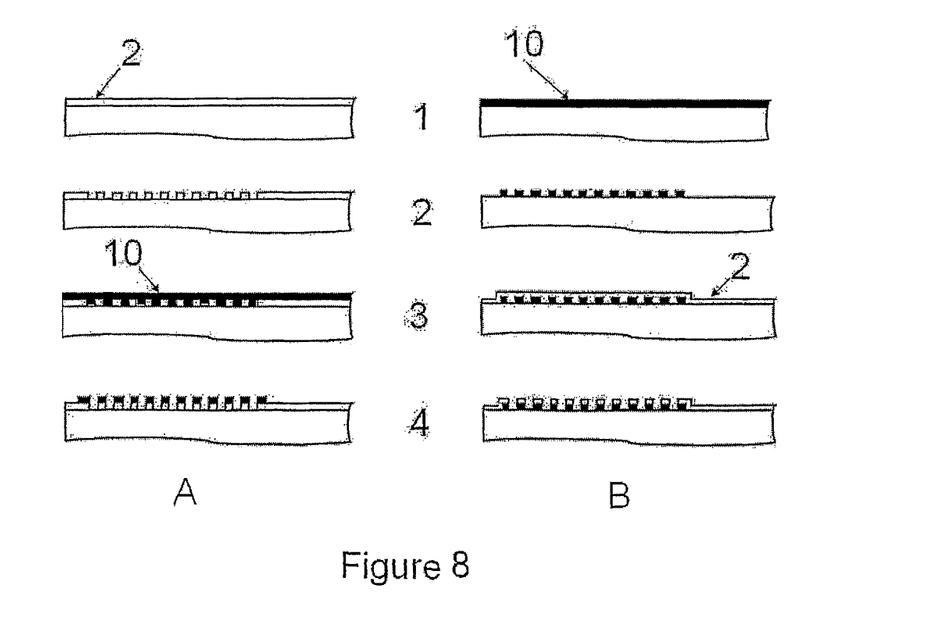
FIG. 8 shows some of the manufacturing stages that are conventionally used to make PCT panels with the busbar structures of the types shown in FIG. 7.

FIG. 8 shows some of the manufacturing stages that are conventionally used to make touch panels with the busbar structures of the types shown in FIGS. 7A and 7B. FIG. 8A shows the case where the metal bands 10 have been applied on top of the upper TCM layer 2. FIG. 8B shows the case where the metal bands 10 are applied directly to the substrate and the TCM layer 2 is applied over the top. FIG. 8A shows the 4 steps required to:
1) Deposit the TCM layer 2 over the whole substrate
2) Pattern the electrodes and busbars in the TCM
3) Deposit the metal 10 over the whole substrate
4) Remove the metal from the centre area of the touch panel and pattern the busbars FIG. 8B shows the 4 steps required to:
1) Deposit the metal layer 10 over the whole substrate
2) Remove the metal from the centre area of the touch panel and pattern the busbars
3) Deposit the TCM layer 2 over the whole substrate
4) Pattern the electrodes and busbars in the TCM At the two patterning stages 2 and 4 in both cases A and B a series of complex lithographic operations have to be carried out involving:
i) Application of a film of positive resist over the TCM or metal layer
ii) Aligning a mask with respect to the substrate
iii) UV exposing the resist through the mask
iv) Developing the resist to create the electrode or busbar pattern
v) Chemical or plasma etching the TCM or metal layer through the apertures_in the resist
vi) Stripping the residual resist These complex operations are costly, slow and environmentally damaging and due to the large number of steps and the small size of the structures to be formed there is a strong likelihood that an error will occur during production leading to a defective part.

The invention is described in more detail with reference to FIGS. 9 to 13.

Figure 9:
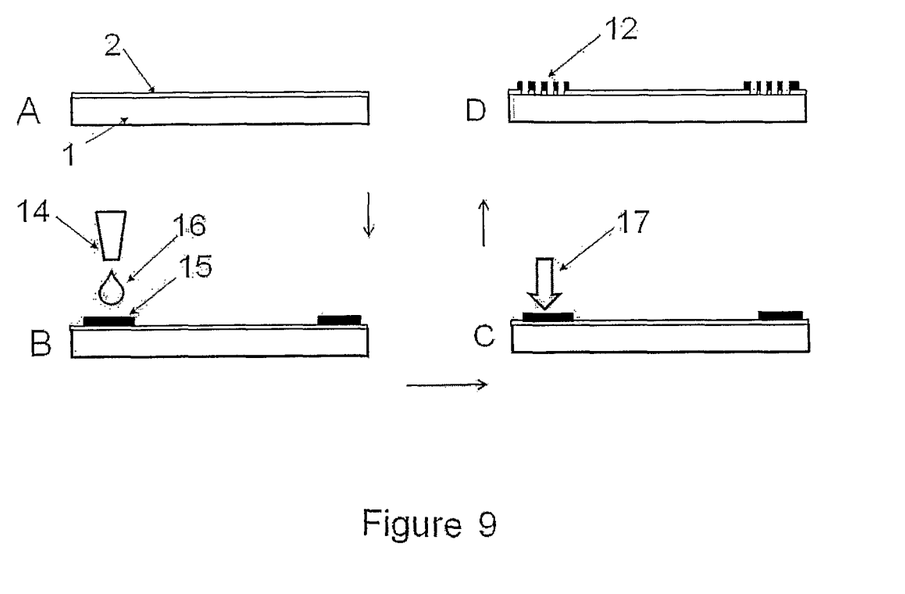
FIG. 9 illustrates in sequence the steps taken to perform the novel method of the present invention.

FIG. 9 shows the steps proposed in one embodiment of a method in accordance with the invention. The starting point is a substrate 1 coated on at least one side with a TCM layer 2 as shown in FIG. 9A. An ink jet print head 14 is then used to form the conducting border regions 15 in a printable conducting ink (PCI) 16 as shown in FIG. 9B. After the ink is cured a laser beam 17 is directed to the PCI and the TCM as shown in FIG. 9C. The beam ablates PCI and TCM materials to create separated conducting tracks to form the busbar structures 12 as shown in FIG. 9D. In the same process step the laser is also used to pattern the TCM layer in the main display area to form the electrodes.

Figure 10:
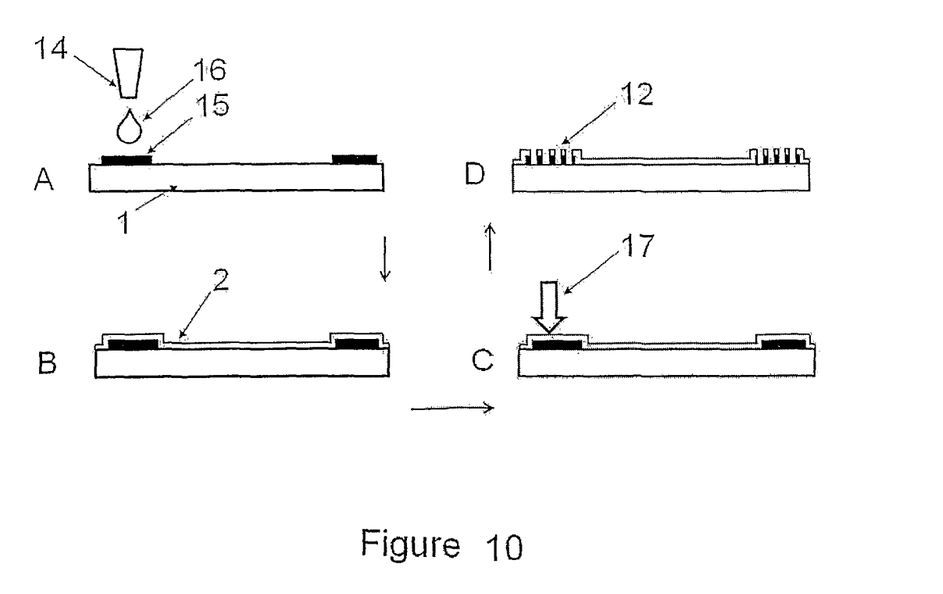
FIG. 10 shows one embodiment of apparatus configured for performing the method of the present invention

FIG. 10 shows the steps proposed in another embodiment of a method in accordance with the invention. An ink jet print head 14 is used to form the conducting border regions 15 on an uncoated substrate 1 using a printable conducting ink (PCI) 16 as shown in FIG. 9A. After the ink is cured a TCM layer 2 is applied as shown in FIG. 9B. A laser beam 17 is directed to the TCM and PCI as shown in FIG. 9C. The beam ablates TCM and PCI materials to create separated conducting tracks to form the busbar structures 12 as shown in FIG. 9D. In the same process step the laser is also used to pattern the TCM layer in the main display area to form the electrodes.

Figure 11:
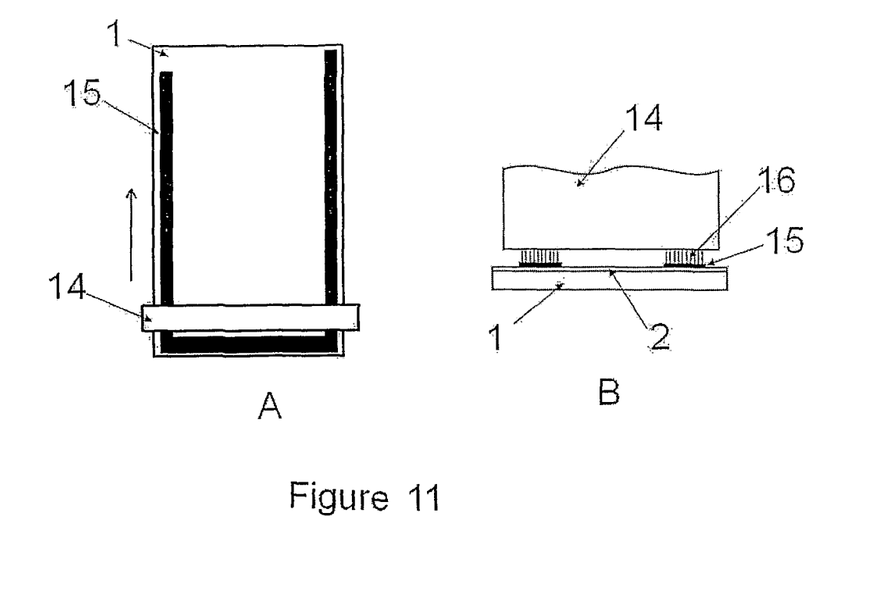
FIG. 11 shows another embodiment of apparatus configured for performing the method of the present invention

FIG. 11 shows details of one embodiment of an apparatus that can be used to apply PCI to the substrate to form the conducting bands 15 for the busbars. An inkjet print head 14 is mounted over the touch panel as shown in FIG. 11A. The print head is sufficiently long that it spans the width of the touch panel. A stage system permits relative motion of the coated substrate in two orthogonal axes. As the print head moves over the substrate surface the appropriate nozzles on the head are activated to jet droplets of a PCI 16 onto the required areas of the substrate surface as shown in FIG. 11B. To achieve full coverage of PCI in the band areas requires the droplets to be applied sufficiently closely that they coalesce on the panel surface. One way to achieve this is to use two print heads that are mounted together with one behind the other in the moving direction and which have a displacement in the direction orthogonal to the moving direction equal to half the pitch of the nozzles. This arrangement is known to be used to increase the resolution of other printing processes.

One suitable ink jet print head for this application is the Konika Minolta KM1024 head. Each print head has two rows of nozzles on a pitch of 0.141.1 mm (180 dpi) giving a net printing pitch of 0.0705 mm (360 dpi). If two of these heads are mounted adjacent to each other with an offset of 0.0705 mm between the heads in the direction along their length then the net result is that the combination of heads prints droplets onto the surface with a pitch of 0.0353 mm (720 dpi). This droplet resolution has been found to be satisfactory in terms of achieving a uniform layer of PCI on the substrate surface. Several other ink jet print heads are also appropriate for this application.

PCIs containing silver particles are suitable for this application. Cabot Conductive Ink 300 has been found to be especially suitable. This PCI has up to several×10% by weight of silver in an ethanol/ethylene glycol mixture. After curing, the printed ink achieves a resistivity of a few times that of bulk silver. An alternative PCI is TEC IJ-060 by Inktec. This ink contains up to 50% by weight of silver in a methanol/toluene/methoxy benzene mixture. Both inks are formulated to adhere well to ITO if used as the TCM. Both inks also adhere well to glass and PET substrates for the case where the PCI layer is situated between the substrate and the TCM. Both inks can be readily printed to a thickness of a few 100 nm which is required to obtain the desired busbar resistivity.

Figure 12:
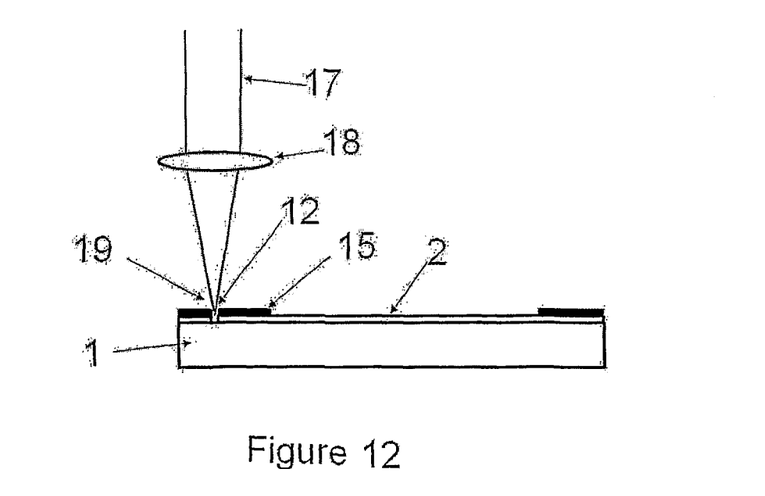
FIG. 12 shows schematically the step of ablating tracks in both the PCI border and underlying TCM layer to form a plurality of discrete electrical busbars and electrodes in accordance with step 3 of the method of the present invention.

FIG. 12 shows how a laser beam might be used in accordance with the invention to form the breaks in the PCI and the TCM to create the busbars and electrodes. A laser beam 17 is focused by a lens 18 to a small spot 19 on the surface of the PCI formed conducting border region 15 and TCM 2 and its parameters are selected to facilitate the remove of material directly by ablation. The substrate is moved in two axes with respect to the laser beam enabling the creation of breaks 12 through both the PCI and the TCM below to divide up the materials to form the busbars in the PCI coated TCM regions. The laser may also be used to ablate the electrodes in the TCM regions not coated by PCI. The figure shows the case where the PCI layer is deposited on top of the TCM layer but the same method is applicable to form busbars if the PCI layer is below the TCM layer Many lasers are suitable for this application but one that is particularly appropriate is a pulsed UV laser operating at 355 nm. With such a laser operating at 100 kHz at a power of 2 W breaks through both the PCI and the TCM can be created at writing speeds up to 1 m/sec.

Figure 13:
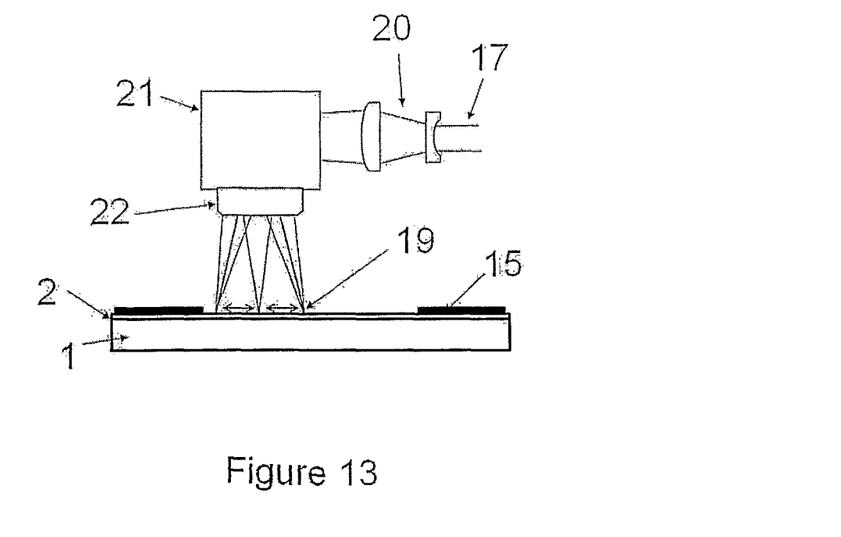
FIG. 13 shows schematically how a laser beam might be moved over the substrate using a scanner to form the breaks in the PCI and the TCM to create the busbars and electrodes in accordance with the method of the present invention.
Figure 14:
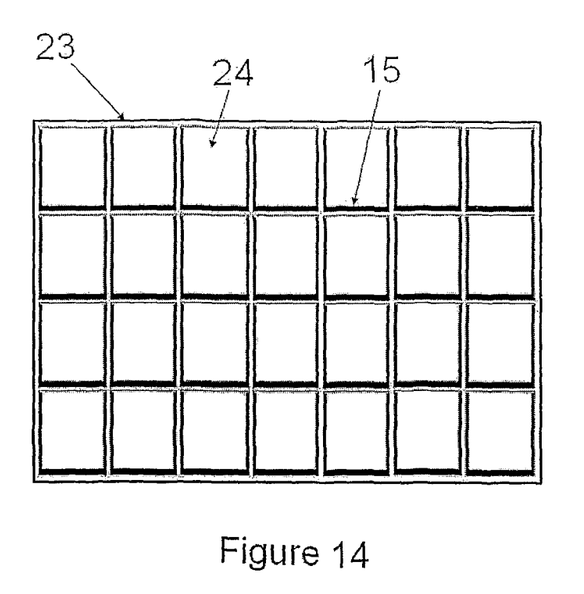
FIG. 14 shows how a typical substrate is laid out with a multiplicity of touch panels manufactured in accordance with the method of the present invention.

FIG. 13: This shows how a laser beam is moved over the substrate using a scanner to form the breaks in the PCI and the TCM to create the busbars and electrodes. Laser beam 17 is expanded by beam expansion optics 20 before entering a two axis scanner unit 21. The beam exiting the scanner is focused by f-theta lens 22 to a spot 19 on the PCI formed conducting border region 15 and the TCM 2 on the substrate. The figure shows the case where the PCI layer is deposited on top of the TCM layer but the same method is applicable to form busbars if the PCI layer is below the TCM layer FIG. 14 shows how a typical substrate is laid out with a multiplicity of touch panels. The substrate 23 has many touch panels 24 (in this case an array of 28). The substrate is first coated all over with a TCM layer and then PCI is applied by printing to define the border busbar regions 15 of the individual touch panels. Alternatively first the areas of PCI are applied by printing to define the border busbar regions 15 of the individual touch panels after which the substrate is coated all over with a TCM layer

The invention claimed is:

1. A method for the manufacture of a projective capacitive touch (PCT) panel comprising;
    onto a transparent substrate, uniformly depositing a layer of transparent conducting material (TCM);
    onto the same transparent substrate or onto the TCM layer printing a printable conductive ink (PCI) in selected areas to form one or more coarse conducting border regions;
    ablating material in the PCI layer and the TCM layer together to form a plurality of discrete electrically conductive tracks (busbars) in said coarse conducting border regions and in the same laser ablation process ablating a pattern of electrodes into the remainder of the TCM layer.

2. The method as in claim 1 where the TCM layer is deposited on the substrate before the conducting border is deposited so the conducting border lies over the TCM layer.

3. The method as in claim 1 where the TCM layer is deposited on the substrate after the conducting border is deposited so the TCM layer lies over the conducting border.

4. The method as claimed in claim 1 wherein the deposited TCM layer is a transparent conducting oxide.

5. The method as claimed in claim 1, wherein the TCM layer is an organic conducting material.

6. The method as claimed in claim 1, wherein the coarse conducting borders comprise a printable conducting ink (PCI) which is deposited by an ink jet print head.

7. The method as claimed in claim 6, wherein the PCI contains silver particles.

8. The method as claimed in claim 4, wherein the TCM is deposited by a physical vapour deposition (PVD) method.

9. The method as claimed in claim 5, wherein the TCM is deposited by an ink jet printing method.

10. An apparatus for the manufacture of a PCT panel, the apparatus comprising:
    a laser, at least one ink jet print head, means for holding a transparent conducting layer deposited on a transparent substrate, means for adjusting the relative positions of the laser and at least one ink jet print head to the transparent conducting layer and a controller configured to control the laser and ink jet print head so as, in a first step to inkjet print one or more coarse metal borders onto the transparent substrate or onto the deposited TCM layer and, in a second step, to ablate electrically conductive tracks in both the metal border and the underlying or overlying TCM layer to form a plurality of discrete electrically conductive busbars and, in the same laser ablation process, to ablate a pattern of electrodes into the remainder of the TCM layer.

11. The apparatus as claimed in claim 10, wherein the apparatus comprises two ink jet print heads mounted together with one behind the other in the moving direction and having a displacement in the direction orthogonal to the moving direction equal to half the pitch of the print head nozzles.

12. The apparatus as claimed in claim 10, wherein the ink jet print heads are configured to deposit a printable conducting ink (PCI) which contains silver particles.

13. The apparatus as claimed in claim 12, wherein the PCI is Cabot Conductive Ink 300.

14. The apparatus as claimed in claim 10, wherein the ink jet head is a Konika Minolta KM1024 head.

15. The apparatus as claimed in claim 10, wherein the laser is a UV laser configured to operate at 355 nm.

16. The apparatus as claimed in claim 10, wherein the controller controls movement of a scanner over the substrate in two orthogonal directions.

17. A projective capacitive touch (PCT) panel comprising a layer of transparent conducting material (TCM) deposited onto a transparent substrate and divided into a plurality of electrodes, and a conducting border deposited onto the transparent substrate or the TCM layer by an inkjet printing method and having laser ablated electrically conductive tracks in both the conducting border and TCM layer to form discrete electrically conductive busbars and wherein the electrodes in the TCM layer are also defined by ablations in the layer.

18. The PCT panel as claimed in claim 17, wherein the TCM layer comprises a transparent conducting oxide.

19. The PCT panel as claimed in claim 17, wherein the TCM layer comprises an organic conducting material.

* * * * *